United States Patent [19]

Johnston

[11] Patent Number: 4,519,616
[45] Date of Patent: May 28, 1985

[54] SHAFT SEAL

[75] Inventor: David E. Johnston, Gosforth, England

[73] Assignee: George Angus & Company Limited, Newcastle, England

[21] Appl. No.: 544,248

[22] Filed: Oct. 21, 1983

[30] Foreign Application Priority Data

Oct. 25, 1982 [GB] United Kingdom ................ 8230453

[51] Int. Cl.³ .............................................. F16J 15/32
[52] U.S. Cl. .................................... 277/152; 277/205
[58] Field of Search ........................ 277/152, 153, 205

[56] References Cited

U.S. PATENT DOCUMENTS

| 2,172,324 | 9/1939 | Victor et al. | 277/153 |
| 3,018,785 | 1/1962 | Adams et al. | 277/205 |
| 4,411,439 | 10/1983 | Couvillion et al. | 277/152 |

FOREIGN PATENT DOCUMENTS 1093974 12/1954 France ................................ 277/152

Primary Examiner—Robert I. Smith
Attorney, Agent, or Firm—William R. Hinds

[57] ABSTRACT

A shaft seal consists of a one-piece rigid plastics moulded ring with a thick holding portion and a thin sealing head having a flexing leg and a sealing bush to make an interference fit and fine running clearance seal against an opposed cylindrical surface.

6 Claims, 1 Drawing Figure

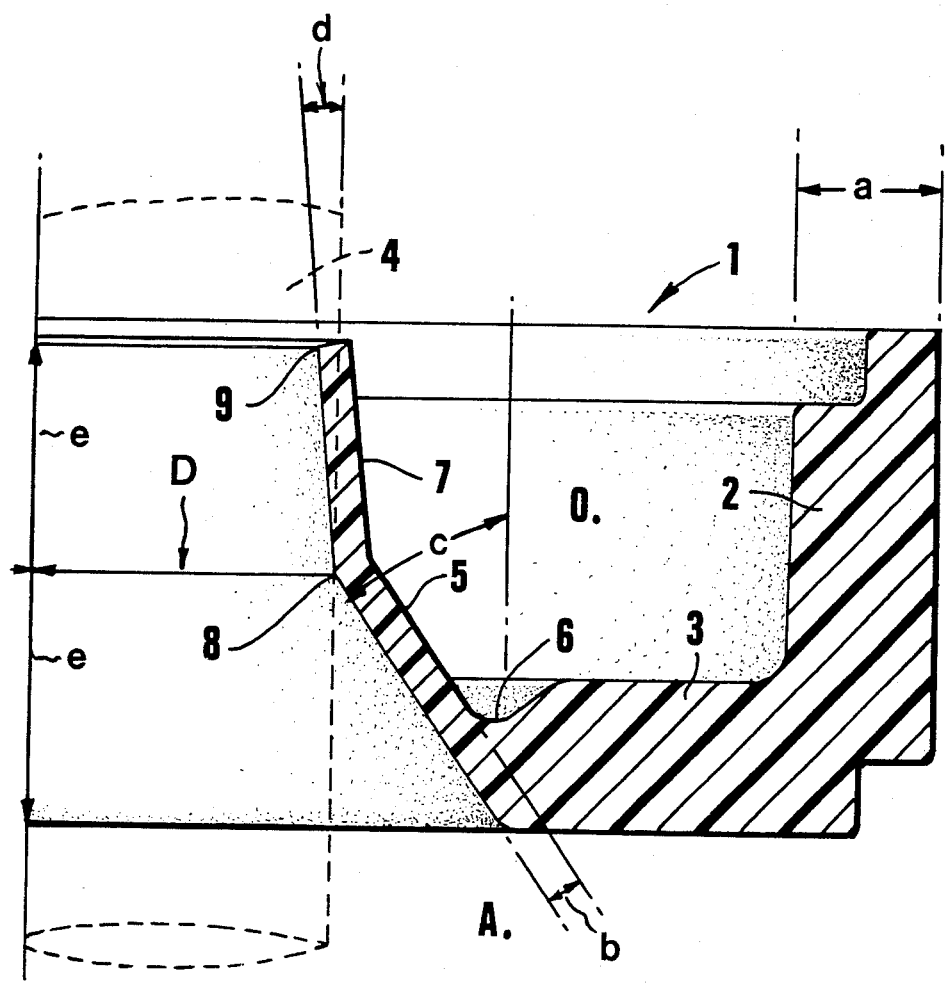

SHAFT SEAL

This invention relates to shaft seals and provides a simple and economical seal for opposing fluid leakage along a rotary shaft, especially a small shaft, such as of a few millimeters diameter, and for retaining grease or other viscous lubricant. The invention is not limited however to such use.

Shaft seal rings of the lip type are usually moulded from a resiliently deformable elastomeric material, especially oil-resistant synthetic rubber, and each ring has a lip, loaded by a contractile garter spring, which bears on the shaft surface around a narrow contact band at which a wiping seal is established.

Other shaft seals are of the bush type, in which a cylindrical sleeve surrounds the shaft with a fine running clearance, the sleeve usually being supported with some freedom of radial movement to follow shaft eccentricity or alignment.

Also used as shaft seals are O-rings, which are simple toroidal rings of elastomeric material.

Except for O-rings, which are deformably mounted in grooves, shaft seals usually comprise two or more components and this raises problems of manufacture and assembly to accurate dimensions for small shafts.

The present invention provides a one-piece shaft seal which can, especially by injection moulding, be accurately made in small sizes to very fine limits. The invention utilises the physical properties of rigid plastics material with a structure which provides for accurate fitting but accommodates to the shaft to be sealed.

According to the invention, a shaft seal consists of a ring moulded in one piece from a rigid plastics material and having a relatively thick holding portion, comprising a peripheral wall and a transverse radial wall, and a relatively thin sealing head, comprising a frusto-conical leg, leading from the radial wall with an abrupt reduction in thickness to enable the leg to flex, and a sealing bush comprising a frusto-conical extension of the leg but of smaller conical angle so that, for a given interference fit against a cylindrical sealed surface, the bush lies in use almost parallel to the sealed surface.

In a preferred embodiment, the relative thickness of the holding portion of the seal and of the leg have a ratio of about 4:1. For example, in an internal seal for a shaft of 4.0 mm diameter, the seal holding portion has a thickness of 1.2 mm and the head a thickness of 0.3 mm, the leg having a conical angle of 35° and the sealing bush an angle of 5° with substantially equal axial lengths of leg and bush, about 2.0 mm. The designed interference is such that the heel at the junction between the leg and bush has the nominal diameter of the shaft.

The material of the seal requires the following properties:

(a) Suitability for accurate injection moulding.
(b) High dimensional stability under stress at temperatures above 70° C. up to 90° C., or even higher for special use.
(c) Resistance to oils, greases and petroleum products.

One example of a suitable material is a polyethersulphone and other plastics having similar physical properties may be used, for example KELANEX (Trade Mark) or RYNITE (Trademark) which are polyesters (polyethylene terephthalate).

The invention is illustrated by way of example on the accompanying drawing showing an internal seal in radial axial section, on a much enlarged scale, the shaft for which it is designed being shown in broken lines.

The seal illustrated is a ring 1, injection moulded in one piece from a stable rigid plastics material, and having a holding portion, comprising an outer peripheral wall 2 and a transverse radial wall 3. The holding portion is fitted statically fluid-tight in a housing around a rotary shaft, indicated as 4, against the outer cylindrical surface of which a dynamic fluid-tight seal is to be maintained.

The dynamic sealing portion of the ring 1 is a sealing head, of substantially lesser thickness than the holding portion, and comprising a frusto-conical leg 5, leading from the radial wall 3 with an abrupt step-down in thickness to form, as it were, a hinge portion 6 to enable the leg 5 to flex.

From the leg 5 extends a slightly frusto-conical sealing bush 7 which forms with the leg 5 a heel 8 of the nominal diameter of the shaft 4 to be sealed.

When passed on to the shaft as an interference fit, the sealing bush 7 lies with its inner periphery substantially parallel with the shaft but initially in contact with the shaft by the extreme lip end 9 of the bush. The diameter of the bush at the heel 8 becomes slightly increased by dilation of the bush.

Between the bush 7 and the shaft there is sufficient axial length of fine running clearance to retain grease against leakage along the shaft and this is maintained even though initial contact of the lip end 9 with the shaft may be lost through wear.

The seal is mounted on a shaft so that grease, or other viscous liquid to be retained, is located outside the sealing head at the so-called oil side of the seal indicated by the reference O, and the inner surface of the sealing head is directed towards the so-called air side of the seal, indicated by A.

An example of suitable dimensions for a seal as shown by the drawing and injection-moulded from polyethersulphone is as follows:

Diameter of shaft $D \times 2 = 4.0$ mm
Thickness of holding portion $a = 1.2$ mm
Thickness of head $b = 0.3$ mm
Conical angle of leg $c = 35°$
Conical angle of bush $d = 5°$
Axial length of leg and bush $e = 2.0$ mm
Diameter of bush at heel 8 (same as shaft) $D \times 2 = 4.0$ mm It is a departure from usual sealing practice to provide a shaft seal moulded from a rigid plastics material, instead of the more usual resiliently deformable material.

The seal of the present invention also has the advantages that it is a very simple one-piece seal which can be accurately moulded to close limits, especially important for small shafts, is simply assembled on to a shaft, tolerating shaft mis-alignment or eccentricity like a lip seal, and under use conditions operates as a bush seal in sealing and retention of lubricant.

Although the seal of the invention has been described and illustrated as an internal seal, the same principle of form and use may be applied to an external seal, to fit statically fluid-tight on a shaft and seal dynamically against a surrounding housing. The radial cross-sectional shape of an external seal may be the same as shown in the drawing but with the wall 2 being an inner peripheral wall to fit on a shaft.

I claim:

1. A shaft seal consisting only of a ring moulded in one piece from a rigid plastics material and having a relatively thick holding portion, comprising a peripheral wall and a transverse radial wall, and a relatively thin sealing head, comprising a frusto-conical leg, leading from the radial wall with an abrupt reduction in thickness in the ratio of about 4:1 at the junction with the radial wall, forming a hinge portion to enable the leg to flex, and a sealing bush comprising a frusto-conical extension of the leg but of smaller conical angle so that, for a given interference fit against a cylindrical sealed surface, the bush lies in use almost parallel to the sealed surface.

2. A shaft seal according to claim 1, the shaft seal being an internal seal, the frusto-conical portion of the leg leading from said abrupt reduction in thickness having a conical angle of about 35°, the conical angle of said bush being about 5° and the axial length of the leg and of the bush being substantially equal.

3. A shaft seal according to claim 1, in which the rigid plastics material is of the group comprising polyethersulphone and polyesters.

4. A shaft seal according to claim 3 wherein the polyester is polyethylene terephthalate.

5. A shaft seal according to claim 1 wherein the rigid plastics material is selected from the group consisting of polyethersulphone and polyethylene terephthalate.

6. A shaft seal consisting essentially only of a ring moulded in one piece from a rigid plastics material having high dimensional stability under stress at temperatures above about 70° C. up to about 90° C., said moulded one-piece ring having a relatively thick holding portion for direct fitment statically fluid-tight to one of a shaft and a surrounding housing, said holding portion comprising a peripheral wall and a transverse radial wall, and a relatively thin sealing head, said sealing head comprising a frusto-conical leg, leading from the radial wall with an abrupt reduction in thickness, forming a hinged portion to enable the leg to flex, and a sealing bush comprising a frusto-conical extension of the leg but of smaller conical angle so that, for a given interference fit against a cylindrical sealed surface, the bush lies in use almost parallel to the sealed surface, the sealing bush forming with the leg a heel of the nominal diameter of the cylindrical surface of the member which it is to dynamically seal.

* * * * *